INVENTOR.
FREDERICK A. STICH

BY

AGENT

CONTROL CIRCUIT
300

United States Patent Office 3,515,974
Patented June 2, 1970

3,515,974
DC TO DC POWER SUPPLY WITH ISOLATED
CONTROL CIRCUIT
Frederick A. Stich, Hales Corners, Wis., assignor to
Automatic Electric Laboratories, Inc., Northlake,
Ill., a corporation of Delaware
Filed May 22, 1968, Ser. No. 731,024
Int. Cl. H02m 3/32, 7/98; H03k 3/30
U.S. Cl. 321—2                                    9 Claims

ABSTRACT OF THE DISCLOSURE

A transistorized power supply for converting a first DC voltage to a second DC voltage, employing a transistor as a series switching element and control circuitry including an oscillator for determining the switching rate so as to provide a regulated output voltage, irrespective of load condition and providing a high degree of isolation between the load circuit and the series switching element.

BACKGROUND OF THE INVENTION

Field of the invention

The present invention relates to power supplies for the conversion of DC energy of a first voltage to DC energy of a second voltage. More specifically, the present apparatus is a DC to DC regulated converter intended for use in electronic switching telephone systems or similar environments. In such environments well regulated electronic power is used by the kilowatt, with the power conditioning equipment amounting to a substantial fraction of the total dollar investment.

In current U.S. telephone practice a —48 volt battery plant is always available for talking circuits and electromechanical apparatus. Therefore it is most practical to derive electric power needed for electronic switching equipment from this conventional telephone office battery.

Description of the prior art

DC to DC converters are well known. Many types are found in standard reference works employing vibrators, silicon controlled rectifiers, transistors and other devices as switching elements in the initial conversion of direct current at a first potential to alternating current. In a second conversion the alternating current is rectified at a second potential. Most efficient power conversion equipment is based on the use of such techniques. However, currents flowing through transformer and choke windings frequently cause acoustic noise problems.

A power supply employing a transistor as the switching element in a manner similar to that described above is disclosed in my copending patent application Ser. No. 555,155 filed June 3, 1966.

Inherent in the usual telephone office battery supply is a severe "noise" problem resulting from large voltage transients caused by extensive use of relays and other electromechanical apparatus in a telephone office. It is important that any regulated power supply used in a telephone office for electronic switching equipment provide a high degree of static regulation, transient response, low output ripple, and low thermal drift, to fully meet the requirements of electronic switching equipment. Likewise, small size, low weight and low cost are important considerations.

SUMMARY OF THE INVENTION

The power converter disclosed herein employs switching techniques referred to above to provide a high degree of power conversion efficiency. To overcome acoustic noise problems, switching in the present converter is performed at frequencies above the audible range. This is accomplished by using high frequency silicon power transistors to obtain efficient power conversion at a 40 kilohertz repetition or switching rate. This same use of high frequency switching techniques is also effective in reducing size, weight and cost.

The present power converter is particularly effective in providing a high degree of static regulation and transient response. This effectiveness stems from utilization of a maximum amount of isolation between the switching circuitry and the load connected to the power converter. This isolation is achieved by inclusion of an oscillator in the control circuit provided between the load and the switching circuitry.

Previous converters usually employed an amplified error signal to correct the switching rate of the principal switching elements. In the present converter an error signal derived from the load and a reference potential source, is applied to an oscillator to control its frequency of operation. The oscillator's output is utilized to correct the principal switching rate of the converter, thus providing maximum isolation and with greater regulatory effectiveness resulting.

Figure 1:
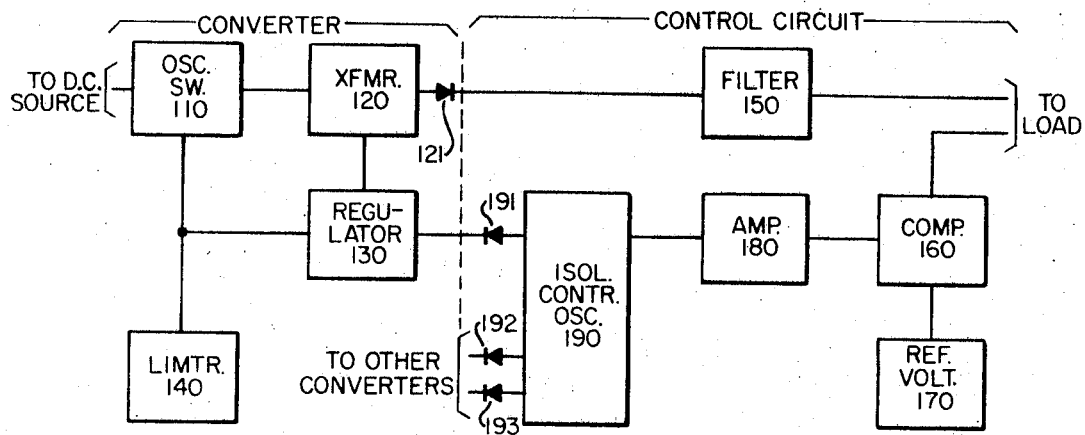
FIG. 1 is a block diagram of a power supply embodying the present invention.

Referring first to FIG. 1, a single converter consisting of oscillator switch 110, transformer 120, rectifier 121, regulator 130 and limiter 140 are shown connected to a control circuit consisting of filter 150, comparator 160, reference voltage source 170, amplifier 180, isolation control oscillator 190 and rectifier 191. Control outputs to other converters (not shown) are made through rectifiers 192 and 193 connected to the control oscillator 190.

Oscillator switch 110 is essentially a transistorized blocking oscillator connected to a source of DC battery. During its conductive state oscillator 110 conducts current for a predetermined period of time from the DC source to the primary of transformer 120. The field of transformer 120 collapses after the predetermined period conducting potential from its secondary winding through rectifier 121 and filter 150 to the load. At the same time energy is also discharged through a drive winding from the transformer 120 to the regulator 130 which acts to turn off the oscillator switch 110.

Potential at the load is sampled and applied to comparator 160 where it is compared with potential from the reference voltage source 170. The resultant signal indicating the amount of error between reference and load potentials is amplified by amplifier 180 and connected to isolation control oscillator 190. The frequency of operation of isolation control oscillator 190 will be determined by the error signal supplied by amplifier 180.

The isolation control oscillator 190 has a plurality of outputs, each isolated from the other and available for operation of a plurality of converters. As shown in FIG. 1, the output of the oscillator 190 is rectified by rectifier 191 with the resultant output pulse applied to regulator 130. This signal is utilized by regulator 130 to determine the proper period of conduction for the oscillator switch 110. Additional converters may be controlled in similar manner over leads extending from rectifiers 192 and 193. The limiter 140 prevents conduction of the oscillator 110 above a predetermined level.

The high degree of isolation existing between the switching oscillator and load, in both the principal current conducting path and the feedback control path result in power conversion efficiency not found in prior art regulators. This isolation results from use of oscillators in both paths. The isolation control oscillator also facilitates the use of several converters in parallel.

Figure 2:
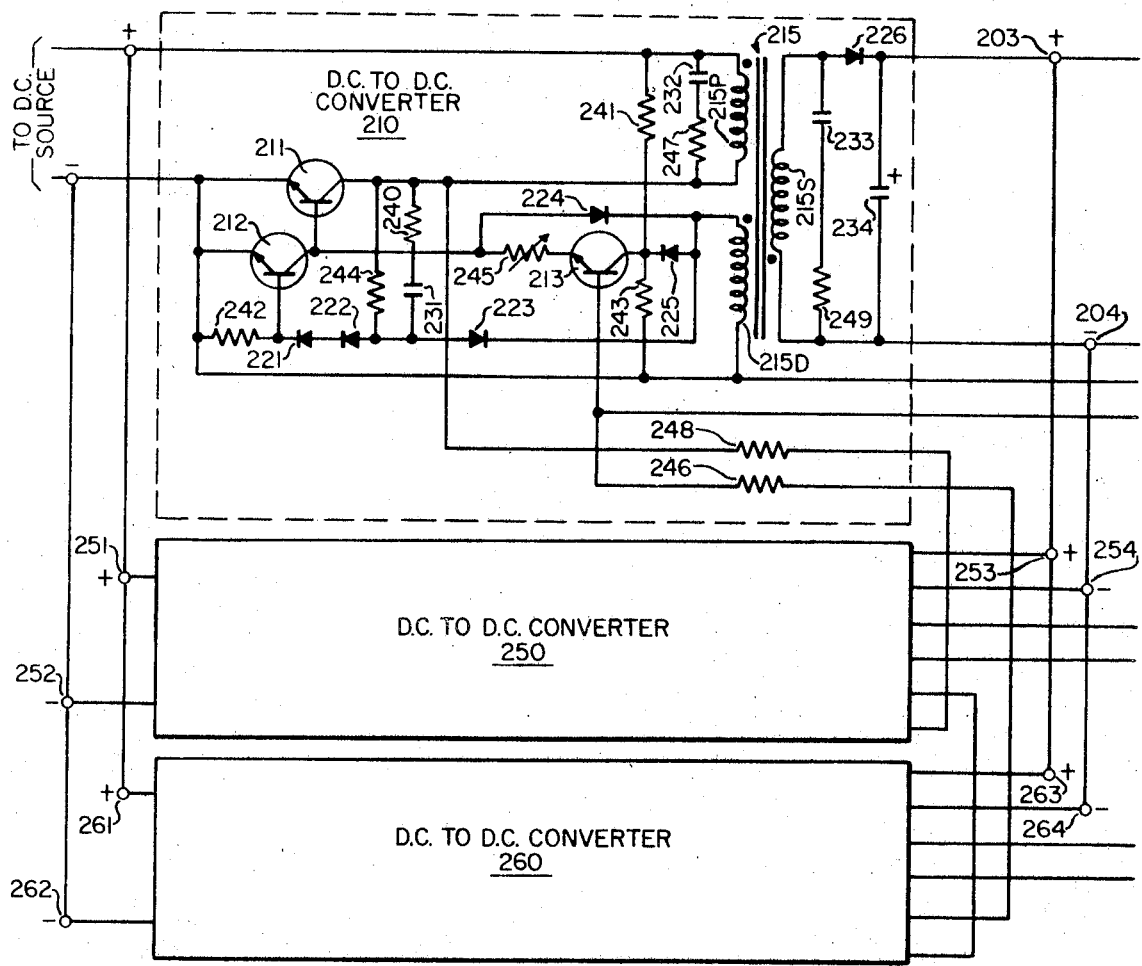
FIGS. 2 and 3 taken together, with FIG. 3 placed to the right of FIG. 2, is a schematic diagram of a DC to DC converter in accordance with the present invention, two similar converters in block form and a schematic diagram of a control circuit for use with a DC to DC power converter, in accordance with the present invention.

Referring now to FIG. 2, three DC to DC converters 210, 250 and 260 are shown. The detailed circuitry of converters 250 and 260 is identical to that disclosed for converter 210. Therefore, the following description will apply to each of the three converters. The input terminals such as 201, 202, 251, 252, 261 and 262 of each converter are connected to a source of direct current such as a telephone central office battery. Transistor 211 with its collector emitter path in the negative lead extending from terminal 202 and the battery source acts as an oscillator power switch. Transistor 213, resistor 245, and diodes 224 and 225 connected to the base of transistor 211 in combination act as a regulator, controlling power switch 211.

Transistor 212, resistors 242 and 244, capacitor 231 and diodes 221, 222 and 223 form a voltage limiting circuit for the power switch transistor 211. Capacitor 232 and resistor 247 across the primary 215P of transformer 215 act as a primary suppression circuit.

When several converters are used in parallel as shown in FIG. 2, synchronization is obtained over leads connected to resistors 246 and 248. Parallel operation will be discussed in detail later.

A secondary suppression circuit consisting of capacitor 233 and resistor 249 is connected across the secondary winding 215S of transformer 215. Each converter also includes leads to the control circuit 300 of FIG. 3, running from the base of transistor 213, and from the negative bus.

Figure 3:
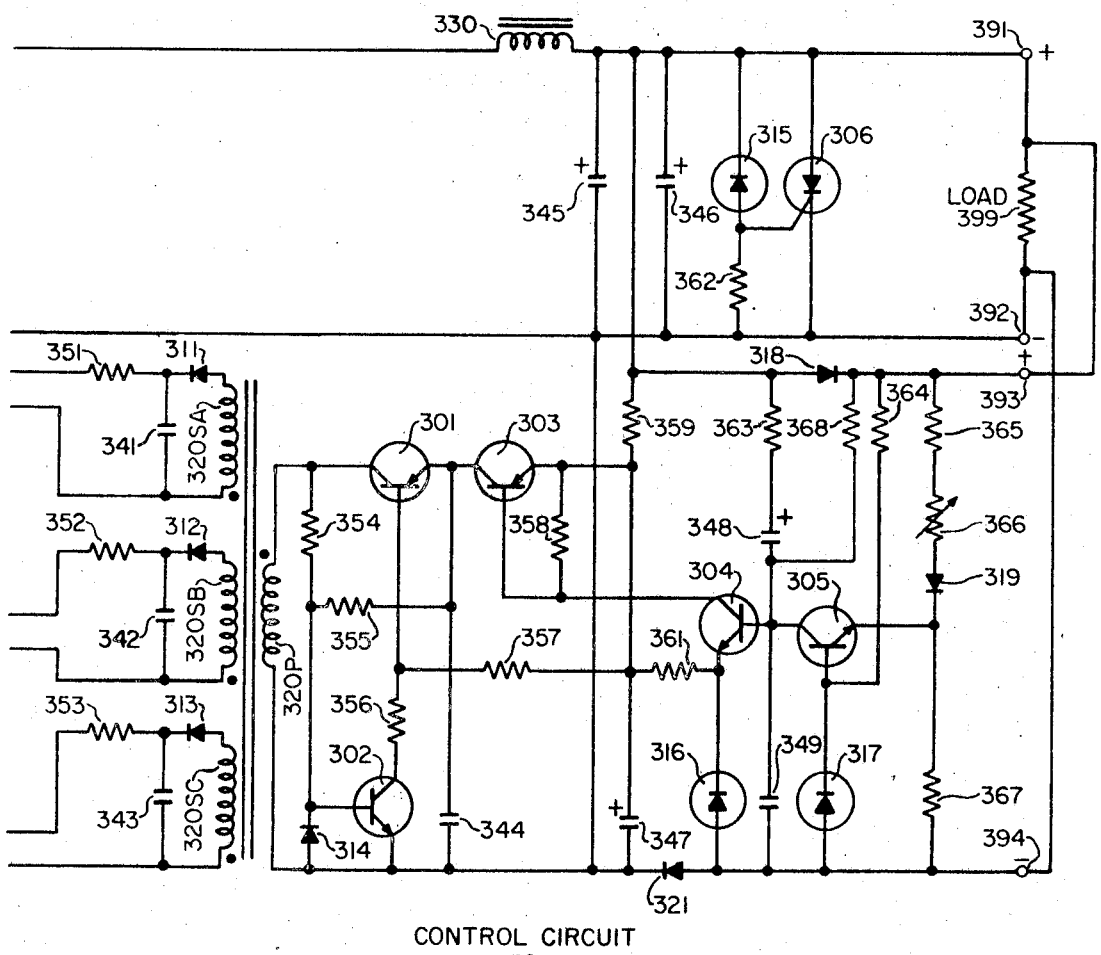

Rectifiers corresponding to 226 are used to rectify the output from the transformer secondary corresponding to 215S in each converter, conducting the positive pulses through the positive output leads connected or multipled to terminal 203 and extending to FIG. 3 and also to a filter capacitor corresponding to 234.

Converter 210 is basically a high power blocking oscillator. The combination of the power transistor 211 and the converter transformer 215 form a regenerative circuit. The polarities of the primary winding 215P and the drive winding 215D are such that a positive feedback occurs. Secondary winding 215S in conjunction with the rectifier 226 is arranged so that the secondary current is blocked during the conduction of the power switch 211. The power switch 211 has almost pure inductance as a load except for its small base drive requirements. Essentially a constant voltage is switched across the primary winding of the converter transformer 215. The current that flows through the primary is also the collector current of transistor 211.

At the start of conduction initial collector current is approximately zero, with the collector current of transistor 211 increasing linearly with time, until the base current supplied becomes inadequate to maintain the transistor 211 in saturation. With transistor 211 no longer saturated, the voltage across the primary winding 215P is no longer constant but decreasing. This decrease in voltage across the primary 115P initiates collapse of the transformer field and also causes turn off of the transistor 211 due to the reversing voltage on the drive winding 215D. The secondary voltage in winding 215S also reverses direction and the stored inductive energy in the transformer is released to capacitor 234 through rectifier 226.

At no time is the power transistor 211 directly connected to the load 399 across terminals 391 and 392 as shown in FIG. 3. Thus an overload has no effect on the power switch transistor 211.

When the current in the secondary winding 215S reaches zero, the drive winding 215D no longer provides reverse drive current to transistor 211 and the transistor proceeds to conduct again in response to forward bias potential. This forward bias potential is conducted over a path from positive battery through the primary winding corresponding to 215P in converter 260 through the associated resistor corresponding to 248 and over the lead connected to resistor 246 of converter 210. This positive forward bias potential causes conduction of transistor 213 to provide the necessary bias for transistor power switch 211. The reasons for deriving this forward bias potential from another converter will be discussed later.

Transistor 213 regulates the drive current applied to the base of transistor 211. By controlling transistor 213 the peak collector current of transistor switch 211 may be regulated to the proper magnitude. The square of the peak collector current is directly proportional to the energy stored per cycle, but the conversion frequency is inversely proportional to the peak collector current. The net result is that the power controlled is directly proportional to the peak collector current.

Referring now primarily to FIG. 3, the control circuit 300 is used to provide the necessary control outputs to the DC to DC converters 210, 250 and 260. Obviously the present invention is not limited to the use of three converters. The utilization of additional converters or a lesser number merely requires modification of transformer 320 to provide the appropriate number of secondary windings.

Choke 330 and capacitors 345 and 346 act as a common filter for the outputs of converters 210, 250 and 260 of FIG. 2. Reference diode 315, resistor 362, and silicon controlled rectifier 306 constitute a "crowbar" or protective circuit of conventional design. The output extending from the three parallel converters of FIG. 2 is connected to the load 399 of FIG. 3 at terminals 391 and 392.

Connected across the load 399 is voltage divider consisting of resistors 365 and 366, diode 319 and 367. The output of this divider taken between diode 319 and resistor 367 is connected to the emitter of transistor 305. Diode 319 provides temperature compensation for this circuit. Transistor 305 acts as a comparator, comparing a reference voltage obtained through reference diode 317, connected to its base, to the voltage obtained from the voltage divider circuit.

The output of transistor 305 is applied to the base of transistor 304 which acts as a DC error amplifier. Bias for transistor 304 is supplied through diode 316. Diodes 318 and 321 provide protection for the control circuit voltage error amplifier, against damage caused by the opening of the sense leads extending from terminal 393 to 391 and 394 to 392 respectively. The output signal from the collector of DC amplifier transistor 304 is applied to the base of transistor 303.

The isolation control oscillator consists of transistors 301, 302 and 303, their associated bias resistors and a tank circuit consisting of the primary winding 320P of transformer 320. Outputs from the oscillator are derived at the secondary windings 320SA, 320SB and 320SC where, by means of rectifiers 311, 312 and 313 output signals are extended to the individual DC to DC converters 210, 250 and 260, respectively, providing the required isolation, and permitting parallel operation.

The isolation oscillator circuitry is similar in operation to that of the converter circuitry. Initially transistor 302 is turned on by means of potential supplied through resistor 355 to the base of transistor 302. After being turned on transistor 302 latches transistor 301 into conduction. Once conduction is established, voltage in the primary winding 320P contributes additional bias through the resistor 354. Transistor 303 acts as an emitter current regulator, with the peak collector-emitter current of transistor 301 determined directly by transistor 303. In this manner the peak collector-emitter current of transistor 301 is directly proportional to the converter control current which is determined by the base current of transistor 303. In other words the output of transistor 305 as amplified by transistor 304 controls the base of transistor 303 and consequently the primary current flowing through transistor 301.

In a manner similar to that explained in connection with transistor 211 in the DC and DC converter 210, the collector current of transistor 301 will increase linearly with time until the base current supplied becomes inadequate to maintain the transistor in saturation. With transistor 301 no longer in the saturated region, the voltage across the primary 320P is no longer constant, but decreasing. The transformer field will then collapse causing turnoff of transistor 302 and resultant turnoff of transistor 301. This results from control exercised by transistor 302 on the base of transistor 301. The voltages in secondary windings 320SA, 320SB and and 320SC also reverse, producing the necessary control output signals or pulses which are extended to DC to DC converters 210, 250 and 260 respectively.

Reference to the preceding description clearly indicates how the present converter is able to control the principal switching element (transistor 211) in response to variations in the potential present at the load 399. The utilization of a control path incorporating an isolation oscillator as embodied in the present invention permits an extremely high degree of regulation.

A practical embodiment of the present invention consisting of a power converter operating from a nominally 48 volt battery, and providing a 24 volt output provided the following results: With battery voltage varied from —42 to —46 volts, output regulation was plus or minus 10 millivolts. When the load was varied from full rating to zero, output regulation was 10 millivolts, plus or minus 10 millivolts.

Figure 4:
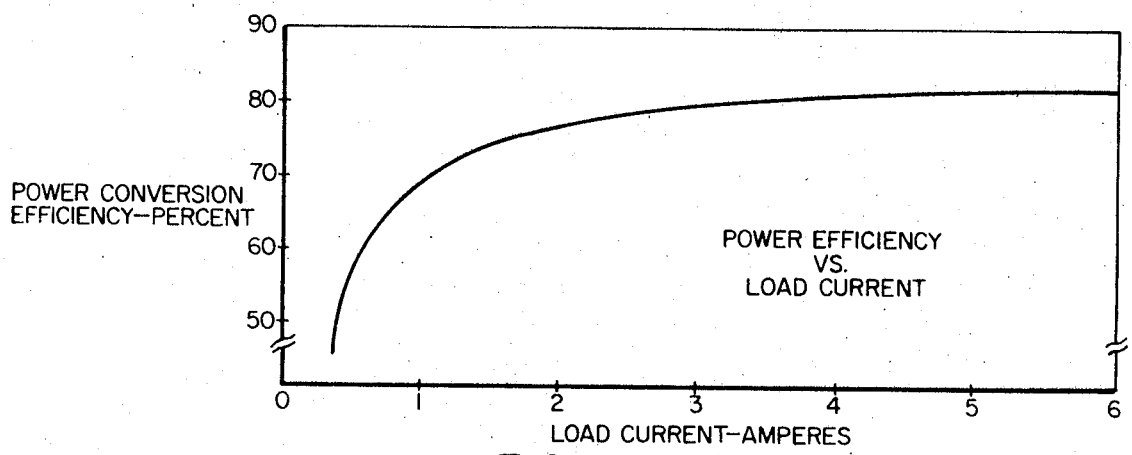
FIG. 4 is a curve indicating the power efficiency versus load current of a power supply constructed in accordance with the present invention.

In the practical embodiment of the inventon referred to above the current rating of the power supply was 6 amperes. In this embodiment the efficiency achieved rose rapidly from no load to approximately 70% efficiency at a load current of one ampere, to approximately 80% at full rated load as shown in the curve of FIG. 4

Referring again to FIG. 2, efficient switching in the present invention results from the proper shaping of the base current applied to the power switch 211. The base drive circuitry for transistor 211 which performs this function consists of a base drive regulator circuit of which transistor 213 is the principal element functioning to regulate forward base drive for transistor 211. Transistor 213 acts as a dependent current generator isolating transistor 211 from the drive winding 215D. Therefore transistor 211 is not responsive to voltage fluctuation in winding 215D. Because of this the end of the conduction period is not precisely determined for transistor 211.

When transistor 211 is no longer saturated, toward the end of the conduction period, the base drive for transistor 211 is not immediately decreased due to the characteristics of transistor 213, thus resulting in a gradual withdrawal from saturation for transistor 211. Variable resistor 245 is used to regulate the maximum forward base drive and also determines the approximate maximum output current of the converter. Diode 224 conducts reverse bias current from the drive winding to the base of transistor 211 during the off or nonconductive period.

Because of the indeterminate end of the conduction period outlined above, a conduction voltage limiting circuit consisting of transistor 213, resistor 244, capacitor 231 and diodes 221, 222, and 223 is employed to remedy this condition. The voltage limit of this circuit is determined by the diode voltages of diodes 221 and 222 and the base to emitter voltage of transistor 212. If the collector voltage of transistor 211 exceeds the limit voltage, transistor 213 is placed in conduction and base current drive is shunted away from transistor 211. This causes transistor 211 in conjunction with the converter transformer circuitry previously outlined to go quickly to a degenerative turnoff period. During the initial stages of turnoff, positive voltage occurs on the side of drive winding 215D, indicated by the dot, which means that reverse voltage also appears across diode 223. When the regenerative turnoff has been fully initiated, a negative voltage appears on the side of the drive winding indicated by the dot, causing diode 223 to conduct. Thus the conduction voltage limiting circuit having completed its function is turned off. Capacitor 231 acts to inhibit the action of the conduction voltage limiting circuit during the turn on process.

Paralleling of converters such as 210, 250 and 260 to increase load handling ability, is accomplished by paralleling the input (201, 202, 251, 252, 261 and 262) and output (203, 204, 253, 254, 263 and 264) terminals of each of the converters as shown in FIG. 2. However each converter is individually connected to a separate control output from the control circuit 300 of FIG. 3.

An important consideration is the maintenance of a low ripple output voltage from the paralleled converters. If the converters were paralleled with no synchronization at all, ripple would be quite large. Each converter would be entirely independent of the others and would make a contribution to the output arbitrarily with respect to the other converters. With no synchronization the output from the parallel converters at times would make no contribution to the power supply output and at other times simultaneous contribution, thus causing a difficult filtering problem.

The following method of synchronization is used to obtain a continuous output from the parallel converters. Referring to FIG. 2, transistor 213 receives a variable reverse bias from the control circuit 300. A forward bias must also be provided at this point. If only a single converter is used this forward bias can easily be obtained through resistor 246 connected to positive battery. However, with two or more converters, synchronized forward bias is used. To do this the bias resistor such as 246 is connected to the collector of the power switch of another one of the converters, for example resistor 246 in converter 210 is connected through a resistor corresponding to 248, to the collector of the power switching transistor corresponding to 210, in converter 260. The bias resistor connected to the base of a transistor corresponding to 213 in converter 250 is connected through resistance 248 to the collector of transistor 211 in converter 210 and the bias resistance in converter 260 is connected to the power switch transistor in converter 250 through a resistance corresponding to 248.

When the power switching transistor of any of the indicated converters is conducting, no forward bias is supplied to the connected converter which will thus be inhibited. Therefore only a portion of the converters can conduct at a given time and in this manner suitable phasing of the output contributions occurs. In this manner two or more converters may be effectively paralleled, to increase current handling capacities, and still maintain minimum amplitude of the ripple component of the output potential. In the previously described practical embodiment of the present connection, this ripple component was restricted to 5 millivolts.

While the principles of the present invention have been described in connection with specific apparatus it is to be clearly understood that this description is made only by way of example and not as a limitation to the scope of the invention.

What is claimed is:

1. A voltage regulator for connection between a source of direct current potential and a load comprising, a converter including a first oscillator connected to said source and operated to produce alternating current potential and switching means connected to said oscillator; rectification means connected between said oscillator and said load operative to convert said alternating current potential to direct current potential and to apply it to said load; a control circuit including a second oscillator connected between said load and said switching means, and a source of reference potential connected to said second oscillator, said second oscillator operative in response to differences in magnitude between said reference potential and the direct current potential applied to said load, to control the on time of said switching means to vary the initiation of each cycle of operation of said first oscillator in a direction to reduce said differences to zero.

2. A voltage regulator as claimed in claim 1 wherein said first converter further includes: a transformer including a primary winding connected to said first oscillator, a secondary winding connected to said rectification means, and a drive winding; and said first oscillator includes said switching means comprising a first transistor connected between said source and said primary winding; drive regulation means comprising a second transistor connected to said first transistor and to a source of bias potential, and operative to render said second transistor conductive; said first transistor being operative in response to said second transistor being rendered conductive to conduct current from said source to said primary winding in continually increasing amounts; said transformer being operative in response to continually increasing current conducted to said primary winding to store energy in proportion to the amount of current thereto; said first transistor being further operative in response to said current reaching a predetermined value to limit further conduction of said current; said transformer being further operative to said current limiting to discharge said energy stored therein; said secondary winding conducting a portion of said discharged energy to said rectification means; said drive regulation means further including a connection between said second transistor and said drive winding, and a connection between said second transistor and said control circuit and being further operative in response to said energy discharge to render said first transistor non-conductive, said energy discharge quantity required to render said first transistor non-conductive being determined by the frequency of operation of said second oscillator.

3. A voltage regulator as claimed in claim 2 wherein said first oscillator further includes: a voltage limiting circuit including a third transistor connected to said first transistor operative in response to conduction of current by said first transistor in excess of a predetermined value to render said first transistor non-conductive.

4. A voltage regulator as claimed in claim 1 wherein said second oscillator comprises: a transformer including a primary winding, and a secondary winding connected to said switching means; a first transistor connected between said load and said primary winding; conduction control means comprising a second transistor connected to said first transistor and to a source of bias potential and operative to render said second transistor conductive; said first transistor being operative in response to said second transistor being rendered conductive to conduct current from said load to said primary winding in continually increasing amounts; said transformer being operative in response to continually increasing current conducted to said primary winding to store energy in proportion to the amount of current conducted thereto; said first transistor being further operative in response to said current reaching a predetermined value to limit further conduction of said current; said transformer being further operative in response to said current limiting to discharge said energy stored therein; said secondary winding conducting a portion of discharged energy to said switching means.

5. A voltage regulator as claimed in claim 4 wherein said control circuit further includes: error detection means comprising sensing means connected to said load, and a third transistor connected to said sensing means and to said reference potential source, said error detection means being operative in response to differences between said reference potential and the potential sensed by said sensing means at said load to produce an error signal; current regulation means comprising a fourth transistor connected between said error detection means and said first transistor and operative in response to said error signal to determine the quantity of current conducted by said first transistor.

6. A voltage regulator as claimed in claim 4, wherein said second oscillator further includes: rectification means connected between said secondary winding and said switching means.

7. A voltage regulator as claimed in claim 1 further including: a plurality of additional converters, each including a first oscillator connected to said source and each operative to produce alternating current potential; a like plurality of additional rectification means each connected between a respective one of said additional converter first oscillators and said load and operative to convert said alternating current potentials to direct current potentials and apply them to said load; said control circuit further including individual circuit connections from said second oscillator to each of said additional converter switching means, said second oscillator being further operative in response to differences in magnitude between said reference potential and said direct current potentials applied to said load to vary the frequency of operation of said additional converter first oscillators in a direction to reduce said differences to zero.

8. A voltage regulator as claimed in claim 7 further including: synchronizing means comprising a bias circuit connected from said first converter to the first of said additional converters and from each of said additional converters to the next successive additional converter and from the last of said additional converters to said first converter, operative in response to one of said converters converting direct current potential to alternating current potential to inhibit said conversion in said successive converter, and said last additional converter being operative in response to the conversion of direct current potential to alternating current potential to inhibit said conversion in said first converter.

9. A voltage regulator as claimed in claim 7 wherein said second oscillator further includes: a plurality of rectification means each connected between said second oscillator and a respective one of said additional converter first oscillators.

References Cited

UNITED STATES PATENTS

| | | | |
|---|---|---|---|
| 2,990,517 | 6/1961 | Grieg | 321—27 X |
| 3,421,069 | 1/1969 | Minks | 321—2 |
| 3,437,903 | 4/1969 | Webb | 321—14 X |

J. D. MILLER, Primary Examiner

W. H. BEHA, Jr., Assistant Examiner

U.S. Cl. X.R.

321—27; 331—47, 112